(12) United States Patent
Guedon et al.

(10) Patent No.: US 7,429,838 B2
(45) Date of Patent: Sep. 30, 2008

(54) CONTROL OF A PIEZOELECTRIC MOTOR

(75) Inventors: Yannick Guedon, Mimosa Park (SG);
Michael Giovannini, Grenoble (FR);
Corinne Ianigro, Grenoble (FR)

(73) Assignee: STMicroelectronics S.A., Montrouge (FR)

( * ) Notice: Subject to any disclaimer, the term of this patent is extended or adjusted under 35 U.S.C. 154(b) by 0 days.

(21) Appl. No.: 11/481,412

(22) Filed: Jul. 5, 2006

(65) Prior Publication Data

US 2007/0018535 A1 Jan. 25, 2007

(30) Foreign Application Priority Data

Jul. 5, 2005 (FR) .................................. 05 52039

(51) Int. Cl.
*H01L 41/04* (2006.01)
(52) U.S. Cl. ....................................... 318/116; 310/317
(58) Field of Classification Search ................. 318/116; 310/317
See application file for complete search history.

(56) References Cited

U.S. PATENT DOCUMENTS

| 3,975,650 A | * | 8/1976 | Payne ..................... 310/316.01 |
| 5,268,621 A | | 12/1993 | Hamers et al. |
| 6,459,190 B1 | | 10/2002 | Johansson et al. |
| 2002/0180387 A1 | | 12/2002 | Kotaoka |
| 2005/0219040 A1 | * | 10/2005 | Dryer ..................... 340/384.71 |
| 2005/0275315 A1 | | 12/2005 | Manabe et al. |

FOREIGN PATENT DOCUMENTS

| FR | 2 735 923 A1 | 12/1996 |
| WO | WO 01/33646 A1 | 5/2001 |
| WO | WO 02/15379 A1 | 2/2002 |

OTHER PUBLICATIONS

French Search Report from French Patent Application 05/52039, filed Jul. 5, 2005.
Patent Abstracts of Japan, vol. 2002, No. 05, May 3, 2002 & JP 2002 027304 A (Minolta Co. Ltd.), Jan. 25, 2002.

* cited by examiner

*Primary Examiner*—Lincoln Donovan
*Assistant Examiner*—Thai Dinh
(74) *Attorney, Agent, or Firm*—Lisa K. Jorgenson; James H. Morris; Wolf, Greenfield & Sacks, P.C.

(57) ABSTRACT

A method for controlling a piezoelectric motor, such that control signals of the motor are periodic non-sinusoidal voltage signals.

17 Claims, 2 Drawing Sheets

CONTROL OF A PIEZOELECTRIC MOTOR

BACKGROUND OF THE INVENTION

1. Field of the Invention

The present invention relates to the control of piezo-electric motors.

2. Discussion of the Related Art

Piezoelectric motors such as motors of type piezolegs sold by Piezomotor Company, are widely used to ensure small displacements of elements of small dimensions. Thus, such motors are used, for example, to ensure the enlargement/reduction function (zoom) of a lens of a device of small dimensions for taking fixed or animated pictures. Such devices are especially incorporated in battery-supplied portable devices having a main function other than taking pictures such as telephones or personal organizers.

FIG. 1 schematically and partially illustrates the operating principle of such a motor 1. An axis AXIS to be displaced in a horizontal direction rests on four pads P1, P2, P3, and P4. Each pad Pi, where i is equal to 1, 2, 3, or 4, rests on a piezoelectric foot Fi. The feet are arranged in two intercalated pairs F1, F3, and F2, F4. Pair F1-F3 is controlled by a voltage signal V13. Pair F2-F4 is controlled by a voltage signal V24. Signals V13 and V24 conventionally are sinusoidal signals of a 6-V amplitude and of a frequency on the order of from 80 to 100 kHz. Signals V13 and V24 typically have the same sinusoidal shapes, frequencies and amplitudes, but are phase-shifted, in phase quadrature.

A known method for controlling such a motor comprises the generation of sinusoidal signals by means of an amplifier directly connected to the motor input. Such a method consumes too high a current for mobile applications.

Rather than generating sinusoidal signals directly provided to the motor, it has been provided to obtain said signals by filtering a digital signal by means of a resonant LC filter having its capacitive elements formed by the very motor.

Such a method is described hereafter in relation with FIGS. 2, 3A, and 3B.

FIG. 2 schematically and partially illustrates an equivalent dynamic electric diagram of piezoelectric motor 1 of FIG. 1 associated with a known control circuit. Pairs F1, F3 and F2, F4 are modeled by two distinct parallel connections 2 and 3, between the same high and low supply rails Vp and GND, of a series association of two respective capacitors C1, C3 and C2, C4 and of a series association of two resistors R1, R3 and R2, R4, respectively. Capacitors C1, C2, C3, and C4 represent the equivalent capacitances of motor 1 while resistors R1, R2, R3, and R4 model the losses. Each connection 2, 3 is associated with a pulse generator (a digital state machine) respectively 4 (signal S1) or 14 (signal S2).

Generator 4 generates a periodic square signal S1 illustrated in FIG. 3A. The duty cycle of square wave S1 of FIG. 3A is equal to ½, that is, signal S1 is at a high level for a same time period (half-period) as at a low level. The output of generator 4 is connected to a first terminal of an inductive element, for example, a coil 6, having a second terminal connected to a common midpoint A1 of series associations C1-C3 and R1-R3 of connection 2. Midpoint A1 corresponds to terminals of feet F1 and F3. As a result, signal S1 is filtered by the LC filter formed of element 6 and of equivalent capacitors C1 and C3. The filtering is performed to obtain, at point A1, a perfect sinusoidal control voltage signal VA1 illustrated in FIG. 3B, of a 6-V amplitude.

Similarly, an inductive element, for example, a coil 16, is interposed between generator 14 and a common midpoint A2 of series associations C2-C4 and R2-R4 of connection 3. Midpoint A2 corresponds to terminals of feet F2 and F4. Digital signal S2 generated by generator 14 has the same duty cycle as signal S1, but phase-shifted with respect thereto to provide pair F2, F4 with a sinusoidal control voltage signal VA2 at point A2, similar to signal VA1 but in phase quadrature with respect to the latter.

To obtain sinusoidal control signals VA1 and VA2 of a given nominal frequency ranging between 80 and 100 kHz, resonant LC filters at the nominal frequency are used. Equivalent capacitances C1, C2, C3, and C4 of motor 1 being very low, on the order of 50 nF, this results in using elements 6 and 16 having a very high inductance, on the order of 30 μH.

A disadvantage of such a method lies in the fact that such elements 6 and 16 are very bulky, which is particularly disturbing in applications of optical units integrated in battery-supplied portable devices.

SUMMARY OF THE INVENTION

An object of the present invention is to provide a method for controlling a piezoelectric motor which overcomes all or part of the disadvantages of known methods.

Another object of the present invention is to provide such a method which uses a low-bulk circuit to be integrated.

Another object of the present invention is to provide such a method which uses a circuit having a decreased power consumption.

To achieve all or part of these and other objects, the present invention provides a method for controlling a piezoelectric motor, such that control signals of the motor are periodic non-sinusoidal voltage signals.

According to an embodiment of the present invention, each control signal is obtained by applying, to an inductive element, forming with equivalent capacitors a non-resonant LC filter, a periodic signal generated by a digital state machine.

According to an embodiment of the present invention, each period of the digital periodic signal is formed of sub-signals of the same number of bits, each bit being able to take a state selected from among first and second values.

According to an embodiment of the present invention, each period of a signal generated by the state machine comprises at least:

a first series of sub-signals in which a selected quantity of most significant bits of the first value of the sub-signal becomes of the second value;

a given integral number of repetitions of a first single-bit signal formed of the bit of the second value;

a second series of sub-signals, inverse to the first series, in which a same selected quantity of least significant bits having the second value of the preceding sub-signal becomes of the first value; and the given number of repetitions of a single-bit signal formed of the bit of the first value.

According to an embodiment of the present invention, the sub-signal sampling frequency is 2 MHz, the number of bits being ten, and:

the selected quantity is equal to one;

the number of repetitions ranges between 0 and 25;

the first sub-signal of the first series only comprises bits of the first value;

the last sub-signal of the first series only comprises bits of the second value;

the first sub-signal of the second series only comprises bit of the second value; and the last sub-signal of the second series only comprises bits of the first value.

According to an embodiment of the present invention, the sub-signal sampling frequency is 2 MHz, the number of bits being ten, and:

the selected quantity is greater than one;
the first sub-signal of the first series comprises at least one most significant bit of the second value;
the last sub-signal of the first series comprises at least one least significant bit of the first value and is repeated to reach the minimum half-period corresponding to a desired maximum frequency value;
the first sub-signal of the second series comprises at least one least significant bit of the first value; and
the last sub-signal of the second series comprises at least one most significant bit of the second value and is repeated to reach the end of a minimum period corresponding to a desired maximum frequency value.

The present invention also provides a piezoelectric motor associated with a control circuit capable of implementing a method according to any of the foregoing embodiments to provide two phase-shifted motor control voltage signals.

The present invention also provides a photographic lens, comprising means capable of cooperating with a motor according to the preceding embodiment.

The present invention also provides a photographic device comprising a lens according to the preceding embodiment.

The present invention also provides a telephone device comprising a photographic device according to the preceding embodiment.

The foregoing and other objects, features, and advantages of the present invention will be discussed in detail in the following non-limiting description of specific embodiments in connection with the accompanying drawings.

DETAILED DESCRIPTION

Figure 1:
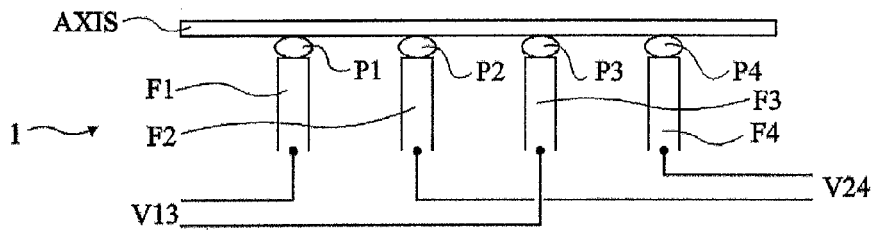
FIG. 1, previously described, is a partial diagram of a piezoelectric motor.

For clarity, the same elements have been designated with the same reference numerals in the different drawings and, further, as usual, the timing diagrams of FIGS. 3A, 3B, 5A, 5B and 6A, 6B are not drawn to scale.

A feature of an embodiment of the present invention is to control a piezoelectric motor with a non-sinusoidal periodic voltage signal.

Figure 4:
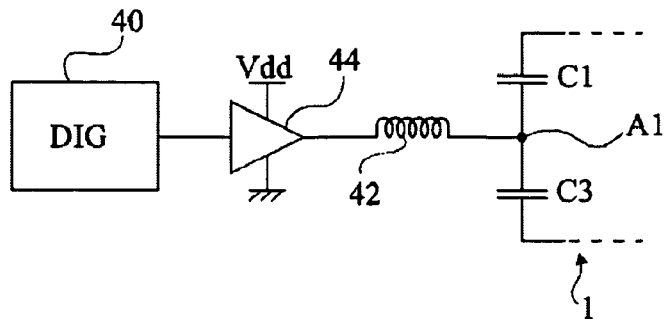
FIG. 4 is a partial electric diagram of a piezoelectric motor and of its control circuit according to an embodiment of the present invention.

FIG. 4 partially and very schematically shows an embodiment of the present invention.

For simplification, only the control circuit associated with connection 2 (FIG. 2), corresponding to pair F1, F3 of feet of motor 1 (FIG. 1) will be described in detail. Further, the equivalent electric diagram of the motor connection, similar to that of FIG. 2, is only partially shown.

A digital state machine (DIG) 40 provides a digital signal sent to a first terminal of an inductive element 42, for example, a coil. The second terminal of element 42 is connected to midpoint A1. Preferably, a class D amplifier 44 is interposed between machine 40 and element 42 to raise the voltage level of the digital signal, for example, from a standard 3-V level to a 6-V level.

According to a feature of the present invention, the inductance of inductive element 42 is of small value as compared with that resulting in a resonant LC filter at the frequency of the received signal. The LC filter formed by the association of element 42 and of capacitors C1 and C3 of motor 1 exhibits, according to the present invention, a resonance frequency different from the frequency of the received digital signal. For example, for a digital signal of a frequency ranging between 80 and 100 kHz, considering that the substantially equal values of equivalent capacitances C1, C2, C3, C4 are on the order of from 50 to 75 nF, the inductance of element 42 will range between 2 and 3 µH, for example, 2.2 µH.

The digital signal output by machine 40 is filtered by the now non-resonant LC filter 42-C1, C3 to provide at point A1 the motor control voltage signal.

Figure 2:
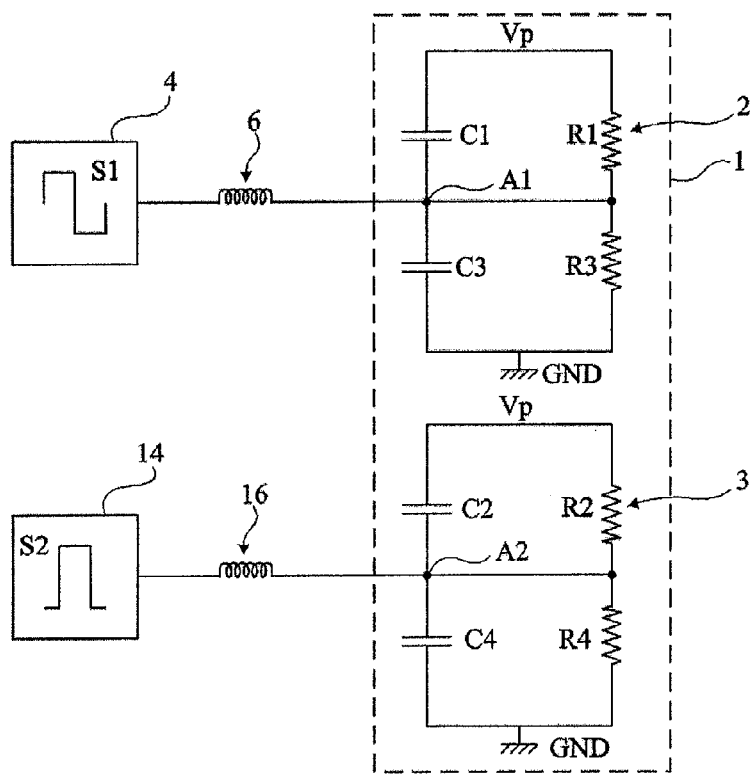
FIG. 2, previously described, is a partial equivalent electric diagram of the motor of FIG. 1 and of its conventional control circuit.

Similarly, the control circuit (not shown) associated with a pair F2, F4 of FIG. 1—connection 3, FIG. 2—comprises a digital state machine, a coil, and a class-D amplifier arranged in a same way as the elements of the control circuit of connection 2. However, the digital signal is modified to obtain at point A2 a voltage control signal V24 phase-shifted with respect to the provided signal VA1 obtained at point A1 with the circuit of FIG. 4.

FIGS. 5A, 5B, 6A, and 6B schematically and partially illustrate various signals according to different embodiments of the present invention measured at various points of the circuit of FIG. 4.

Figure 5A:
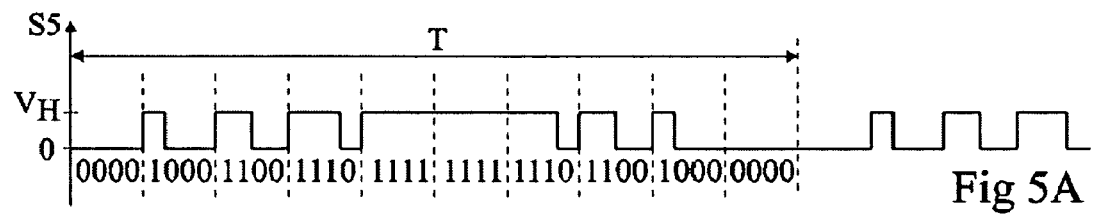
FIG. 5A is a simplified partial timing diagram illustrating a digital signal generated by a state machine of the circuit of FIG. 4 according to an embodiment of the present invention.
Figure 5B:
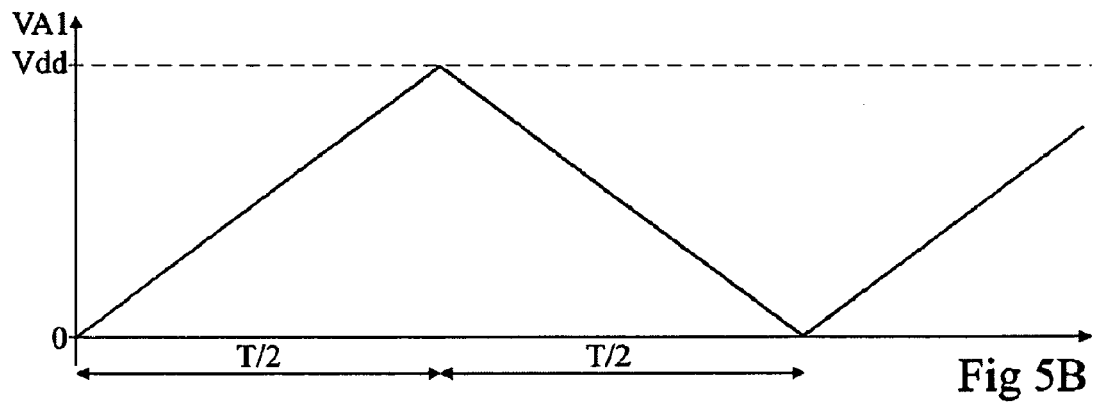
FIG. 5B is a simplified partial timing diagram illustrating a control signal of a piezoelectric motor obtained from the digital signal of FIG. 5A.
Figure 6A:
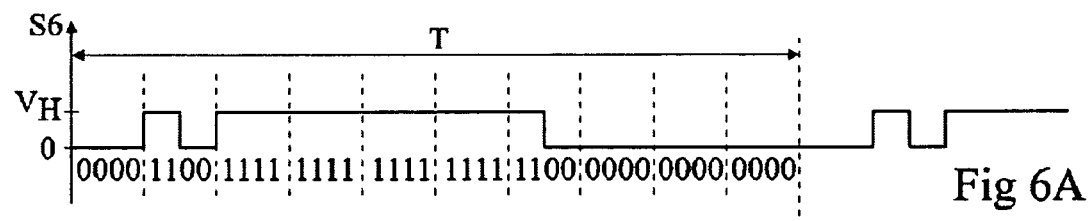
FIG. 6A is a partial simplified timing diagram illustrating a digital signal generated by a state machine of the circuit of FIG. 4 according to another embodiment of the present invention.
Figure 6B:
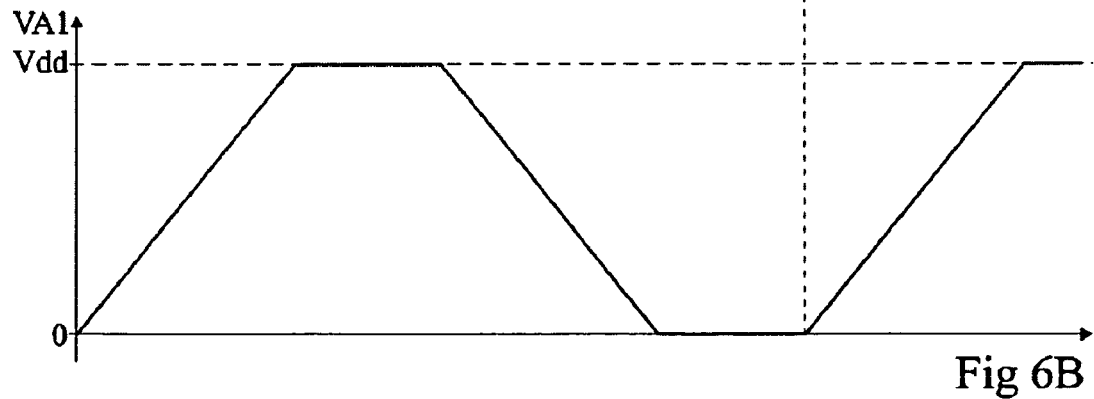
FIG. 6B is a partial simplified timing diagram illustrating a control signal of a piezoelectric motor obtained from the digital signal of FIG. 6A.

For clarity, only the digital signal, FIGS. 5A and 6A, provided by machine 40 to obtain a signal VA1, FIGS. 5B and 6B, at point A1 is described hereafter. It will be within the abilities of those skilled in the art, based on the descriptions of such signals, to obtain the same signal VA2 for feet F2 and F4 of motor 1, but phase-shifted with respect to signal VA1.

FIG. 5A shows a timing diagram of a pulse train S5 provided by circuit 40 and FIG. 5B schematically illustrates a period T of signal VA1 obtained at point A1 by filtering of digital signal S5 of same period T.

Digital signal S5 is divided—sampled—into sub-signals. Each digital sub-signal comprises a number N of pulses or bits.

Signal S5 is described hereafter in the case of a ten-bit sampling, but shown for simplification with a sampling of four bits only.

A first half-period (T/2) of signal S5 starts with a single initial sub-signal only formed of bits "0". Then, the most significant bit equal to "0" is replaced with a bit "1". Such a replacement is performed by step of one to reach a first central sub-signal only formed of bits "1".

In the case of a ten-bit sampling, the first half-period of digital signal S5 is formed of the following sequence:

0000000000; 1000000000; 1100000000; 1110000000; 1111000000; 1111100000; 1111110000; 1111111000; 1111111100; 1111111110; 1111111111.

In the shown example of a four-bit sampling, signal S5 thus starts with a sequence: 0000; 1000; 1100; 1110; 1111.

As illustrated in FIG. 5B, such a first half-period of signal S5 leads, after non-resonant LC filtering 42-C1, C3, to a first half-period of control signal VA1 increasing from a minimum value to a maximum value Vdd. The interval between the minimum and maximum values is six volts. For example, the minimum value is zero while the maximum value is equal to 6 V.

Then, during the next half-period, digital signal S5 repeats once the central sub-signal only comprising "1"s and returns to a final sub-signal only comprising "0"s by replacing, by steps of one, the least significant bit "1" with a bit "0".

In the case of a ten-bit sampling, signal S5 ends with a sequence: 1111111111; 1111111110; 1111111100; 1111111000; 1111110000; 1111100000; 1111000000; 1110000000; 1100000000; 1000000000; 0000000000.

In the example shown in FIG. 5A of a four-bit sampling, signal S5 thus ends with a sequence: 1111; 1110; 1100; 1000; 0000.

Such a second half-period of signal S5 corresponds to a decreasing half-period of control signal VA1 illustrated in FIG. 5B.

Signal VA1 is, as illustrated in FIG. 5B, a triangular signal of period T.

Figure 3A:
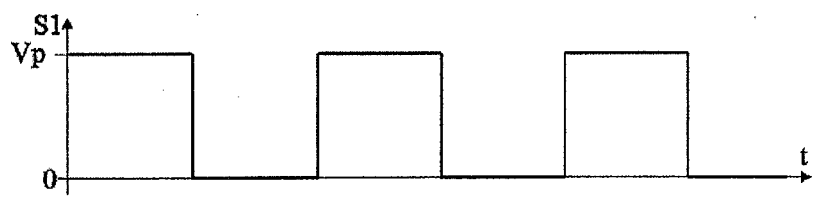
FIGS. 3A and 3B, previously described, are timing diagrams schematically and partially illustrating the conventional control of the motor of FIG. 2.
Figure 3B:
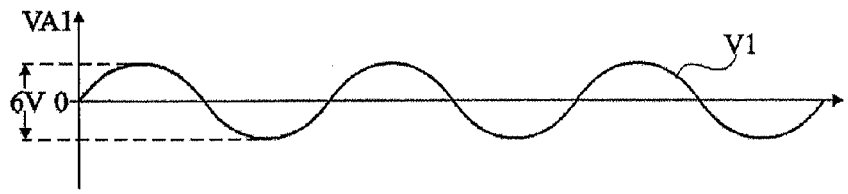

The present inventors have found that, unexpectedly, the operation of motor 1 is not affected by the replacing of the conventional sinusoidal control voltage signal of FIG. 3B with the triangular signal of FIG. 5B.

Further, inductive element 42 having a relatively low value, on the order of 2.2 μH, is advantageously insertable in an optical unit, conversely to the corresponding element 6 of a 30-μH value used in the embodiment of FIG. 2.

Another advantage of such a method lies in its reduced power consumption. Thus, while the generation of a sinusoidal signal by the circuit of FIG. 2 would cause a power consumption on the order of 500 mW, the power consumption of the control circuit according to the present application is decreased to approximately 50 mW.

To increase the period of voltage signals VA1 and VA2, and thus decrease their frequency, from the triangular signal of minimum period—maximum frequency, for example, of 100 kHz—of FIG. 5B, the peaks at the minimum (0) and maximum (Vdd) end values are replaced with steady states at such values. For a given signal VA1, the duration of stabilization at the minimum value is equal to the duration of stabilization at the maximum value.

As compared with the digital circuit of FIG. 5A, the digital signal enabling obtaining such a control signal comprises a same number M of repetitions, at the end of the first sequence, of a single-bit signal formed of bit "1" and, at the end of the second sequence, of a single-bit signal exclusively formed of bit "0".

Assuming that the sampling of digital signal S5 is 2 MHz and that number N of bits is 10, to vary the frequency of control signal VA1 between 80 and 100 kHz, number M of repetitions of the single-bit signals ranges between 1 and 25.

The operation of piezoelectric motor 1 is not affected by the use as control signals of such signals.

In the preceding embodiments, it has been considered that the increasing and decreasing sequences of the digital signal are obtained by replacing a single bit with its complementary value.

According to another embodiment of the present invention, signals exhibiting faster increasing and decreasing sequences are used to control the piezoelectric motor.

Such an embodiment is described hereafter in relation with the timing diagrams of FIGS. 6A and 6B.

FIG. 6A shows a timing diagram of a pulse train S6 provided by circuit 40 and FIG. 6B schematically illustrates a period T of the corresponding signal VA1 obtained at point A1 by filtering of digital signal S6 of same period T.

Signal S6 is described hereafter in the case of a ten-bit sampling, but shown for simplification with a four-bit sampling only.

The period of the signals of FIGS. 6A, 6B is the same as that of the signals of FIGS. 5A, 5B. For simplification, only the differences between FIGS. 5A and 6A, 5B and 6B are described hereafter.

Signal S6 comprises a first sequence starting from an initial signal, after which a given number P of most significant bits "0" are replaced, by steps of one, with bits "1" until a state in which less than P least significant bits are equal to "0" is reached, where P is greater than 1.

For example, for P=2, in the case of a four-bit sampling illustrated in FIG. 6A, signal S6 comprises the first sequence: 0000, 1100, 1111. Signal S6 thus comprises an increasing sequence with three sub-signals instead of five in signal S5 of FIG. 5A.

In the case of a ten-bit sampling, the increasing sequence of digital signal S6 will comprise less sub-signals than the homologous signal S5. In practice, the inventors' studies have shown that in this case, it is better to start from sub-signal 1000000000. The increasing sequence of signal S6 for P=2 thus is: 1000000000; 1110000000; 1111100000; 1111111000; 1111111110, that is, five sub-signals instead of eleven for the sequence of the corresponding signal S5.

To obtain a same maximum frequency, minimum period, the rest of the increasing sequence of signal S5 is replaced in signal S6 with a repetition of the last sub-signal of the increasing sequence.

Thus, in the example where P=2, in the illustrated case of a four-bit sampling, signal 1111 is repeated twice. In the case of a ten-bit sampling, with a sub-sampling at 2 MHz, for a maximum 100-kHz frequency, signal 1111111110 is repeated six times.

As illustrated by the comparison of FIGS. 5B and 6B, a signal VA1 exhibiting a faster increased phase between a minimum value, for example, zero, and a maximum value Vdd, for example, equal to 6 V, followed by a stabilization period at maximum value Vdd which maintains until the half-period, is thus obtained in FIG. 6B.

Then, signal S6 comprises sub-signals in which the P least significant bits equal to "1" are replaced with zero bits until a sub-signal comprising less than P bits equal to "1" is obtained.

In the case where P=2, for a four-bit sampling, the sequence then is: 1111, 1100, 0000. As compared with signal S5 of FIG. 5A, the rest of the half-period is completed by the repetition of twice the last sub-signal 0000.

In the case of a ten-bit sampling sub-sampled at 2 MHz, to obtain a maximum 100 kHz frequency, the sequence is: 1111111110; 1111111000; 1111100000; 1110000000; 1000000000; followed by a repetition of six times sub-signal 10000000000.

As for the signal of FIG. 5A, to increase the period and thus decrease the frequency of control signal VA1 with fast increasing and decreasing ramps, to enable a frequency variation within the range from 80 to 100 kHz, a repetition of from 1 to 25 times of signals formed of a single bit "0" or "1" is introduced similarly to what has been previously described.

The operation of the piezoelectric motor is not affected by the use as control signals of a signal VA1 of FIG. 6A and of a similar but phase-shifted signal VA2.

More generally, the base signal having the highest frequency is obtained from a digital signal comprising N-bit sub-sampled sub-signals comprising:

a first sequence of successive sub-signals in which the P most significant bits equal to "0" are replaced with bits "1", where P is a non-zero integer smaller than N;

a repetition of the last sub-signal of the preceding sequence, to reach the end of the first half-period;

a second sequence of successive sub-signals, inverse to the first one, in which the P least significant bits equal to "1" are replaced with bits "0"; and a repetition of the last sub-signal of the preceding sequence, to reach the period.

The signal period is then increased, that is, the frequency is decreased, by repeating a same number of times:

a single-bit signal exclusively formed of bit "1" before the second sequence; and a single-bit signal exclusively formed of bit "0" after the repetition of the last sub-signal which follows the second sequence.

Of course, the present invention is likely to have various alterations, modifications, and improvements which will readily occur to those skilled in the art. In particular, the present invention has been described in FIG. 4 with a digital state machine capable of generating any one of the previously-described digital signals. However, it should be understood by those skilled in the art that according to the considered application, the state machine may be designed to generate several of these signals.

Further, it will be within the abilities of those skilled in the art to select the motor control signal according to the shape of the variation of the desired force developed by the motor.

It will also be within the abilities of those skilled in the art to adapt the control signals and the digital signals to the application, in particular to the desired frequency range. Thus, it will be within the abilities of those skilled in the art to adapt the number of bits and the number of sub-signals of the different digital signals to a wanted frequency range.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for controlling a piezoelectric motor, wherein control signals of the motor are periodic non-sinusoidal voltage signals having a triangular or triangle-truncated shape, each control signal being obtained by applying to an inductive element, forming with equivalent capacitors of the motor a non-resonant LC filter, a periodic signal generated by a digital state machine, and each period of the digital periodic signal being formed of at least two different variable series of sub-signals of same number of bits, each bit being able to take a state selected from among first and second values and in a variable series, a sub-signal being able to take a value different from either one of or both its neighboring two sub-signals.

2. The method of claim 1, wherein each period of a signal generated by the state machine comprises at least:

a first series of sub-signals in which a selected quantity of most significant bits of the first value of the sub-signal becomes of the second value;

a given integral number of repetitions of a first single-bit signal formed of the bit of the second value;

a second series of sub-signals, inverse to the first series, in which a same selected quantity of least significant bits having the second value of the preceding sub-signal becomes of the first value; and the given number of repetitions of a single-bit signal formed of the bit of the first value.

3. The method of claim 2, wherein the sub-signal sampling frequency is 2 MHz, the number of bits being ten, and wherein:

the selected quantity is equal to one;

the number of repetitions ranges between 0 and 25;

the first sub-signal of the first series only comprises bits of the first value;

the last sub-signal of the first series only comprises bits of the second value;

the first sub-signal of the second series only comprises bit of the second value; and the last sub-signal of the second series only comprises bits of the first value.

4. The method of claim 2, wherein the sub-signal sampling frequency is 2 MHz, the number of bits being ten, and wherein:

the selected quantity is greater than one;

the first sub-signal of the first series comprises at least one most significant bit of the second value;

the last sub-signal of the first series comprises at least one least significant bit of the first value and is repeated to reach the minimum half-period corresponding to a desired maximum frequency value;

the first sub-signal of the second series comprises at least one least significant bit of the first value; and the last sub-signal of the second series comprises at least one most significant bit of the second value and is repeated to reach the end of a minimum period corresponding to a desired maximum frequency value.

5. A piezoelectric motor, associated with a control circuit capable of implementing the method of claim 1 to provide two phase-shifted motor control voltage signals.

6. A photographic lens, comprising means capable of cooperating with the motor of claim 5.

7. A photographic device, comprising the lens of claim 6.

8. A telephone device, comprising the photographic device of claim 7.

9. A method of controlling a piezoelectric motor, the method comprising:

generating a digital signal comprising a series of bits;

filtering the digital signal to produce a control signal having a triangular or triangle-truncated shape; and controlling the piezoelectric motor using the control signal;

wherein generating the digital signal comprises generating a periodic series of bits, each period comprising a plurality of sub-signals of a same number of bits, each bit having a first value or a second value, wherein generating the plurality of sub-signals comprises:

generating a first series of sub-signals in which a quantity of bits of the first value increases for later sub-signals of the first series of sub-signals, wherein the first series of sub-signals, when filtered, produces an increasing portion of the control signal; and generating a second series of sub-signals in which a quantity of bits of the first value decreases for later sub-signals of the second series of sub-signals, wherein the second series of sub-signals, when filtered, produces a decreasing portion of the control signal.

10. The method of claim 9, wherein filtering the digital signal comprises filtering with a non-resonant LC filter.

11. The method of claim 10, wherein filtering the digital signal comprises passing the digital signal through an inductor having an inductance value of less than or equal to 3 µH.

12. The method of claim 9, wherein:
one or more most significant bits of each sub-signal of the first series of sub-signals has the first value; and
one or more least significant bits of each sub-signal of the second series of sub-signals has the first value.

13. A control circuit for controlling a piezoelectric motor using a control signal, the circuit comprising:
a digital circuit that generates a digital signal comprising a series of bits; and
an inductor that filters the digital signal to produce a control signal having a triangle or triangle-truncated shape;
wherein the digital signal generator generates the digital signal which comprises a periodic series of bits, each period comprising a plurality of sub-signals of a same number of bits, each of the bits having a first value or a second value, the plurality of sub-signals comprising:
a first series of sub-signals in which a quantity of bits of the first value increases for later sub-signals of the first series of sub-signals; and
a second series of sub-signals in which a quantity of bits of the first value decreases for later sub-signals of the second series of sub-signals.

14. The control circuit of claim 13, wherein the digital circuit comprises a digital state machine.

15. The control circuit of claim 13, wherein the inductor has an inductance value of less than or equal to 3 µH.

16. The control circuit of claim 13, wherein:
the first series of sub-signals, when filtered, provide an increasing portion of the control signal;
wherein the second series of sub-signals, when filtered, provide a decreasing portion of the control signal.

17. The control circuit of claim 13, wherein:
one or more most significant bits of each sub-signal of the first series of sub-signals has the first value; and
one or more least significant bits of each sub-signal of the second series of sub-signals has the first value.

* * * * *